Aug. 11, 1959   G. C. AKERLOF   2,899,371
METHOD OF PREPARING ORGANO-SILICON COMPOUNDS
Filed May 21, 1957
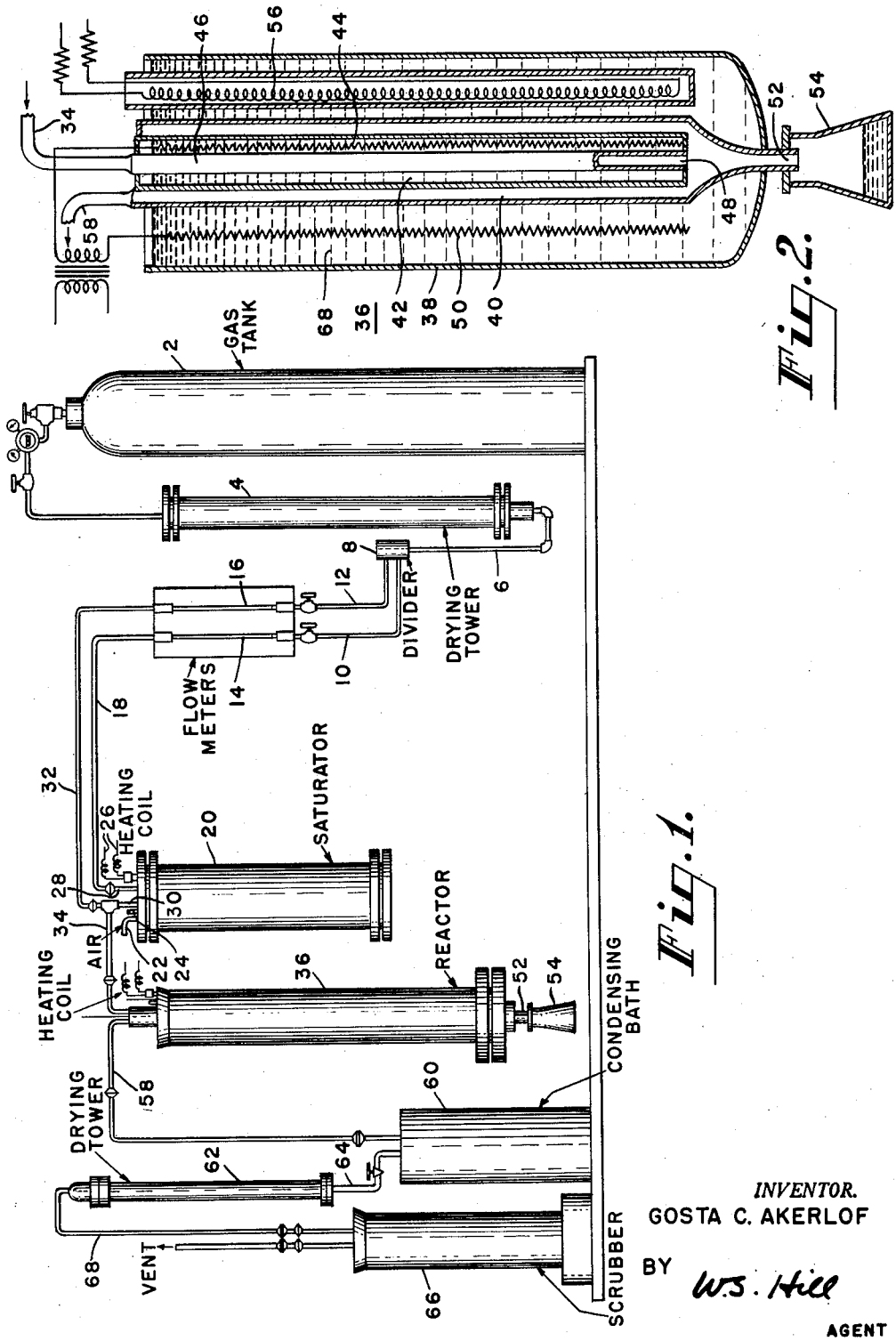
INVENTOR.
GOSTA C. AKERLOF
BY *W.S. Hill*
AGENT

United States Patent Office 2,899,371
Patented Aug. 11, 1959

2,899,371

METHOD OF PREPARING ORGANO-SILICON COMPOUNDS

Gosta C. Akerlof, Princeton, N.J., assignor to Aerochem Research Laboratories, a corporation of Maryland Application May 21, 1957, Serial No. 660,511

15 Claims. (Cl. 204—165)

The present invention relates to an improved method of preparing certain organic-silicon compounds and, more particularly, relates to an improved method of preparing organo-silicon monomers with a carbon-silicon linkage, of the type also known as silanes.

The silanes have the general formula $Si_nH_{2n+2}$ but the class also includes substitution products wherein halogen atoms are substituted for one or more of the hydrogen atoms, and in which alkyl or alkoxy radicals are substituted for one or more of the hydrogen atoms.

Some of the silanes are useful in themselves as waterproofing agents and the like but their principal use at present is in the manufacture of polymers such as the silicone oils and resins. In the preparation of silicone polymers, the compound dimethyldichlorosilane $$(CH_3)_2SiCl_2$$

is of particular interest since it has proven to be most efficient in the preparation of long chain polymers containing C—Si linkages.

A number of methods have been utilized previously for the preparation of organo-silicon monomers which include a carbon-silicon bond. In general these may be divided into methods involving a substitution reaction and those involving a direct combination of carbon and silicon atoms.

The substitution methods include the following reactions:

(1) Utilization of the Friedel and Crafts synthesis, wherein alkyls of zinc, mercury, or aluminum, are reacted with alkyl silicates, or silicon tetrachloride, or hydrogen substitution products of silicon tetrachloride.

(2) The so-called Wurtz reaction, in which an organic halide and a silicon halide are coupled by reaction with metallic sodium.

(3) The Grignard reaction, a two-stage process in which the first step is the reaction of a suitable alkyl or aryl halide with magnesium suspended in a straight-chain aliphatic ether to produce the corresponding alkyl or aryl magnesium halide, or, more correctly, an equilibrium mixture of the organomagnesium halide with magnesium dialkyl and magnesium dihalide; the second step is to add a silicon halide or ester to this mixture. There are variations of this process in which the synthesis is accomplished in a one-stage reaction.

(4) Direct absorption of unsaturated hydrocarbons or carbon monoxide by silicon tetrachloride at high pressures in the presence of a catalyst. This is not true substitution but addition followed by re-arrangement.

An object of the present invention is to provide an improved method for preparing organo-silicon monomers adapted to low-cost manufacturing techniques.

Another object of the invention is to provide a continuous method of producing silanes containing a carbon-silicon linkage.

A further object is to provide an improved method of preparing organo-silicon monomers in which the ratio of output of the more desirable low-boiling compounds to high-boiling compounds are produced in high yield at low energy cost.

A particular feature of the present invention by which the foregoing objects are achieved is an improved method wherein an electrical discharge is passed through a vapor phase mixture of a silicon halide and a hydrocarbon where the hydrocarbon is present in considerable molar excess with respect to the halide, to produce a product which usually comprises a mixture of various silanes which can then be separated as desired. The discharge is preferably of the "electrodeless" type in which the discharge occurs between insulating surfaces but it may also be an alternating current or direct current corona.

The invention will now be described in greater detail with reference to the accompanying drawing in which:

Fig. 1 is an assembly drawing of a complete reactor system, including an electrodeless discharge reactor, for carrying out the method of the present invention on a relatively small scale;

Fig. 2 is a more detailed drawing, cross-section elevation view, of the reactor shown in Fig. 1.

The reactants which may be used in carrying out the method cover a wide variety of substances. One of the reactants is a silicon halide, preferably silicon tetrachloride, or an alkyl or a hydrogen-substituted silicon halide. The other is practically any hydrocarbon which can be obtained conveniently and handled in the vapor phase. These hydrocarbons include paraffins, olefins, halogen-substituted paraffins, cycloparaffins, aromatics including benzene and alkyl-substituted benzene ring compounds, naphthenes, terpenes, and any mixture of these.

In all cases the reaction product is a mixture of compounds rather than a single compound, the complexity of the mixture and the variety of components being determined in part by the complexity of the hydrocarbon selected as the reactant. The product, as produced by the particular method of the present invention, always includes some of the low-boiling silanes, e.g., methyltrichlorosilane, dimethyldichlorosilane, and trimethylchlorosilane when methane is the hydrocarbon. Even when the reacting hydrocarbon is a simple one such as methane, some of the higher boiling silanes are also included.

The reaction is carried out in the vapor phase but most of the reactants used are liquids at ordinary room temperatures. Any conventional method can be used for vaporizing all reactants. If one of the reactants is already a gas and the other is a liquid, the gaseous reactant can be passed through the liquid reactant becoming saturated with the vapor of the liquid, and this mixture can be led into the reactor. If both reactants are liquids, a carrier gas such as hydrogen can be bubbled through each liquid, preferably at elevated temperature, such that the carrier gas becomes saturated with the vapor of the reactant, and the mixture of the reactant vapors, still including the carrier gas, can be led into the reactor. If the entire system including the reactor is evacuated, the liquid reactants may be heated to vaporize them and the heated vapors may be brought together in the reactor.

Many different forms of apparatus can be used in carrying out the method of the invention and it is not intended that the apparatus which is illustrated be limiting in any way. It is suitable for making relatively small quantities of product on a laboratory scale. Obviously, the principles utilized can be adapted to manufacturing the product on a commercial scale.

Referring now to the drawing, wherein similar parts are designated with the same numbers in the two figures, Fig. 1 shows a complete reactor system in diagrammatic form. Where one of the reactants is a gas, such as methane, a supply tank 2 of the gas is connected to a dryer tower 4 filled with phosphorous pentoxide for removing any moisture that may be in the gas. The drying tower is connected by a pipe 6 to a divider 8 where the gas is split into two streams. From the divider, these streams flow through pipes 10 and 12 and through flow meters 14 and 16. From the flow meters, one pipe 18 leads to a saturator 20. The saturator has an outer jacket for containing a liquid bath, such as aqueous propylene glycol, for controlling the temperature of the liquid in an inner container. To stir the liquid in the outer jacket, air is led in through an inlet pipe 22 and out through an outlet pipe 24. The outer jacket also contains a heating coil having electrical connections 26. The pipe 18 is connected to a bubble pipe 28 leading to the bottom of the inner container of a saturator. An outlet pipe 30 is connected to the top of the inner container. This outlet pipe is connected to a second pipe 32 leading from the flow meters. From the saturator, a pipe 34 leads to the reactor 36.

The reactor 36 is shown in more detail in Fig. 2. It comprises three concentric chambers: the outermost chamber 38 for holding a bath of an inert conducting liquid, a middle reaction chamber 40, and an inner chamber 42 of annular shape containing one of the discharge electrodes 44 immersed in a conducting liquid. The pipe 34 is connected to the central bore 46 of the inner chamber, the bore having a bottom orifice 48 connecting it with the middle reaction chamber. A second discharge electrode 50 is immersed in the liquid of the outer chamber 38. The discharge actually occurs between the inner surface of the outer chamber 38 and the outer surface of the inner chamber 44. The bottom of the reaction chamber has an orifice 52 leading into a collecting flask 54. To control the temperature, the outer chamber is provided with a heating coil 56 and may also have conventional stirring means (not shown).

From the top of the reaction chamber, a pipe 58 leads to a conventional condenser 60 which may be filled with Dry Ice or other cooling medium. The condenser is connected to a drying tower 62 through a pipe 64, and the drying tower is connected to a scrubber 66 through a pipe 68.

Utilizing the above-described apparatus, a typical example of the method of the present invention will now be described.

EXAMPLE 1

*The paraffins*

Methane gas from tank 2 is first passed through the drying tower 4 to remove moisture, and then to the divider 8 where it is split into two streams. One of the streams flows through pipe 18 into the heated saturator 20. The inner chamber of the saturator is filled with liquid silicon tetrachloride and the methane is bubbled through it so that it becomes saturated with the vapor of the silicon compound. The liquid bath in the outer chamber of the saturator, which may be polyethylene glycol, may be maintained at a tempature of, say, 70° C. but this temperature is not critical in any way.

The silicon tetrachloride-saturated methane gas stream is now re-united with the other stream of methane which by-passed the saturator in pipe 32 and the combined stream is led into the reactor 36 through central bore 46. The mol ratio of the mixture comprises about 5 parts methane to 1 part silicon tetrachloride. After this mixture is swept through the middle chamber 40 of the reactor for a time sufficient to displace all of the air, high voltage current from a conventional source (not shown) is connected to the discharge electrode wires 44 and 50 forming an "electrodeless" discharge of alternating current between the glass walls of the reaction chamber. The electrode area is taken as the outer wall area of the inner chamber 42 and in these examples was about 1000 $cm.^2$. The electrode wires are immersed in an inert liquid 68, which may be polyethylene glycol, to which a small amount of sodium chloride has been added to increase its electrical conductivity. The inert liquid may be heated to any desired temperature below its boiling point to control the temperature of the reaction chamber. In this case it is maintained at a temperature of about 70° C.

The voltage of the discharge is about 14.5 kv. and the current is at 120 ma. at 800 cycles per second (c.p.s.). The gas flow is maintained at 300 cc./min.

Under the influence of the discharge, the methane and silicon tetrachloride react to produce a liquid product which is a mixture of compounds. A portion of this product comprises relatively high boiling silanes which condense immediately and are collected in the flask 54 beneath the reaction chamber. Most of the remainder comprises lower boiling silanes, including substantial proportions of dimethyldichlorosilane, trimethylmonochlorosilane, and monomethyltrichlorosilane. These become swept out of the top of the reaction chamber by the pressure of the gaseous mixture entering the reaction chamber and are converted to liquid form in the condenser 60. Unreacted gases and hydrogen chloride, which is also formed in the reaction, are passed then through drying tower 62 and the hydrogen chloride is removed in the scrubber 66. The total yield of both low-boiling and high-boiling compounds is 16 gm./hr.

The conditions under which the reaction is caused to take place may be varied in many ways to change the nature of the product and to obtain highest possible efficiency. For example, the temperature of the reactor may be increased or decreased; it may be maintained at over 100° C. but if it is too high, some of the product is polymerized. At 200° C. it was found that a glassy solid was formed. When the objective is to produce polymerized intermediates this type of reaction must be inhibited.

The potential of the discharge may be varied over a rather wide range but it is preferred to keep the average voltage gradient in the discharge (average voltage gradient means the applied voltage divided by the distance between discharge surfaces) within a range of about 2 to about 12 kv. per mm. In the present examples the discharge gap was 3 mm.

The current density of the discharge was about 0.12 milliampere per square cm. ($ma./cm.^2$). This may be increased to about 0.5 $ma./cm.^2$ at the frequency chosen but may be ten times this value if the frequency is increased to about 10 kc. (kilocycles). The current density may be as low as 0.1 $ma./cm.^2$ at the lowest frequencies. Thus, the current density selected depends upon several factors, such as frequency of the discharge current and the dielectric used for the electrode walls. In the present example the dielectric was ordinary Pyrex glass. The various parameters are chosen to obtain good efficiency without arcing.

When an electrodeless discharge is used, as in this example, the preferred frequency range is about 25 to about 10,000 c.p.s. However, much higher frequencies, up to at least about one megacycle may be used. Other forms of discharges may be used also, such as A.C. or D.C. corona.

Atmospheric pressure is preferred for pressure of the gaseous mixture within the reaction chamber, for convenience in designing and maintaining equipment but the pressure may be either lower or higher. Pressures of a few atmospheres, i.e., 4 or 5 are operative also.

Rate of gas flow through the reaction chamber may be greatly varied also so that each unit volume of the gas has a contact time within the reaction chamber of from about 0.1 second to about 300 seconds. Shorter contact time favors formation of lower proportions of the less desirable high-boiling silanes.

The mol ratio between the reactants may be varied considerably but it is required that a substantial excess of hydrocarbon be present. Preferred mol ratio of hydrocarbon to silicon compound is 5 to 1, but this may vary between about 2 to 1 and of the order of about 20 to 1.

EXAMPLE 1A

In the same manner as in Example 1, propane gas was reacted with silicon tetrachloride. The temperature of the reaction chamber was 70° C., the voltage of the discharge was 11.0 kv. at a current of 50 ma. and the gas flow was 200 cc./min. The mol ratio of hydrocarbon to silicon tetrachloride was about 4 to 1. The liquid yield was 11 gm./hr.

Any one, or mixtures, of the gaseous or liquid paraffin hydrocarbons can be similarly reacted with silicon tetrachloride, for example, butane, pentane, hexane, heptane, octane, nonane, including their isomers, etc., up to $C_{15}H_{32}$, although the gaseous members and the lower-boiling liquids are preferred. When the liquid members are used, a carrier gas such as hydrogen, is bubbled through both the silicon tetrachloride and the hydrocarbon in separate streams which are mixed in the reactor. Two saturators are used instead of one as illustrated in the drawing, otherwise the process is the same.

EXAMPLE 2

*The unsaturated hydrocarbons*

As in Example 1, butadiene-1,3 was reacted with silicon tetrachloride at a temperature of 60° C. at a frequency of 1800 c.p.s. The voltage of the discharge was 11.8 kv. at a current of 146 ma. and the total gas flow was 100 cc./min. The mol ratio of hydrocarbon to silicon tetrachloride was about 5 to 1. The liquid yield was 19 gm./hr.

Any of the gaseous or liquid olefins can be similarly reacted, for example, ethylene, propylene, butylene, amylene, etc up to octadecylene which melts at just about room temperature. Corresponding members of the acetylene series of hydrocarbons can be used also.

EXAMPLE 3

*Halogen-substituted aliphatics*

Halogen-substituted hydrocarbons of the aliphatic series can be reacted in the same way as the hydrocarbons themselves. $CH_2BCl$ was reacted with silicon tetrachloride by passing hydrogen gas through each of the two liquid reactants and mixing the vapors in the reactor as previously described. The operating temperature of the reactor was 68° C. at a frequency of 800 c.p.s. The voltage of the discharge was 10.6 kv. at a current of 56 ma. and the gas flow was 100 cc./min. The mol ratio of hydrocarbon to silicon tetrachloride was about 4 to 1. The liquid yield was 15 gm./hr.

EXAMPLE 3A

Trifluoromethane ($CHF_3$) and silicon tetrachloride were also reacted, hydrogen being passed through both liquids to act as a carrier gas. The operating temperature of the reactor was 45° C. at a frequency of 800 c.p.s. The voltage of the discharge was 19.5 kv. at a current rate of 68 ma. and the gas flow was 100 cc./min. The mol ratio of trifluoromethane to silicon tetrachloride was about 3 to 1. The liquid yield was 19 gm./hr.

EXAMPLE 3B

Although carbon tetrachloride is not a hydrocarbon, it is a halogen-substitution product of methane. It can be reacted with silicon tetrachloride to form silanes in a manner similar to the other compounds which have been desired. Hydrogen gas was used to pick up the vapor of the carbon tetrachloride and this hydrogen then took part in the reaction. The frequency was 800 c.p.s. The voltage of the discharge was 12.4 kv. at a current of 60 ma. and the gas flow was 100 cc./min. The mol ratio of carbon tetrachloride and hydrogen to silicon tetrachloride was about 5 to 1. The product formed included some solid polymers and the total yield was 28 gm./hr.

EXAMPLE 4

*Terpenes*

Using hydrogen as a carrier gas, limonene was reacted with silicon tetrachloride, the temperature of the reactor being 80° C. at a frequency of 3200 c.p.s. The voltage of the discharge was 17.6 kv. at a current of 155 ma. and the gas flow was 200 cc./min. The mol ratio of hydrocarbon to silicon tetrachloride was about 7 to 1.

The product collected represented a 50% increase in weight over the weight of liquid limonene introduced into the reactor. Liquids such as these can be reacted also by permitting them to drip slowly into the reactor and caused to vaporize rapidly by holding the reactor at relatively high temperatures which may be well below the boiling point of the liquid however.

EXAMPLE 5

*Carbocyclics*

As an example of the carbocyclic compounds, cyclohexane, using hydrogen as a carrier gas, was reacted with silicon tetrachloride. The operating temperature was 98° C. at a frequency of 1800 c.p.s. The voltage of the discharge was 9.2 kv. at a current of 155 ma. and the gas flow was 100 cc./min. The mol ratio of hydrocarbon to silicon tetrachloride was about 7 to 1. The liquid yield was 17 gm./hr.

EXAMPLE 6

*Aromatics*

Benzene ring compounds, including substituted ring compounds, can be utilized also in the method of the present invention. Benzene vapor in hydrogen gas was reacted with silicon tetrachloride using an operating temperature of 80° C. at a frequency of 1600 c.p.s. The voltage of the discharge was 10.4 kv. at a current of 182 ma. and the gas flow was 500 cc./min. The mol ratio of hydrocarbon to silicon tetrachloride was about 9 to 1. The liquid yield was 11 gm./hr. and included some phenyl silanes and diphenyl silanes. Naphthalene and anthracene can be similarly reacted but temperatures must be higher to obtain appreciable vaporization.

When methane was used as a carrier gas at an operating temperature of 100° C., with the voltage of the discharge at 12.2 kv., a current of 105 ma., and a gas flow of 80 cc./min., the liquid yield was 12 gm./hr.

EXAMPLE 6A

To test the use of silicon compounds other than silicon tetrachloride as one of the reactants, benzene, using hydrogen as a carrier gas, was reacted with silicon tetrafluoride carried in hydrogen. The temperature of the reactor was 85° C. at a frequency of 400 c.p.s. The voltage of the discharge was 16 kv. at a current of 52 ma. and the gas flow was 300 cc./min. The mol ratio was about 9 to 1 hydrocarbon to silicon tetrafluoride. The liquid yield was 12 gm./hr.

EXAMPLE 6B

Toluene, in a hydrogen gas carrier, was reacted with silicon tetrachloride using a reactor temperature of 98° C. at a frequency of 3200 c.p.s. The voltage of the discharge was 18 kv. at a current of 162 ma. and a gas flow of 100 cc./min. The mol ratio of hydrocarbon to silicon tetrachloride was about 10 to 1. The yield was 30 gm./hr.

EXAMPLE 6C

A mixture of p-xylene (in hydrogen gas carrier) and silicon tetrachloride were reacted using a reactor temperature of 98° C. at a frequency of 800 c.p.s. The voltage of the discharge was 9.3 kv. at a current of 60 ma., and a gas flow of 100 cc./min. The mol ratio of hydrocarbon to silicon tetrachloride was 8 to 1. The liquid yield was 26 gm./hr.

EXAMPLE 6D

Using hydrogen gas as a carrier, mesitylene was reacted with silicon tetrachloride using a reactor temperature of 90° C. at a frequency of 800 c.p.s. The voltage of the discharge was 9.0 kv. at a current of 60 ma., and a gas flow of 200 cc./min. The mol ratio of hydrocarbon to silicon tetrachloride was about 10 to 1. The liquid yield was unusually high at 60 gm./hr. In general, the alkyl-substituted benzene ring compounds produce high yields of the silanes in the present method.

EXAMPLE 6E

Alkyl-substituted benzene ring compounds with some or all of the hydrogen atoms on the side chains replaced by halogens can be utilized also. As an example, phenyl trifluoromethane, in hydrogen gas, was reacted with silicon tetrachloride at a reactor temperature of 84° C. at a frequency of 3200 c.p.s. The voltage of the discharge was 11.4 kv. at a current of 146 ma., and a gas flow of 200 cc./min. The mol ratio of phenyl trifluoromethane to silicon tetrachloride was about 9 to 1. The liquid yield was 37 gm./hr.

EXAMPLE 7

*Mixtures of petroleum hydrocarbons*

Mixtures of hydrocarbons can be used with results similar to those using single compounds. A mixture of low-boiling hydrocarbons, mostly pentanes and hexanes, also commonly known as petroleum ether, was reacted with silicon tetrachloride using hydrogen gas as a carrier for the hydrocarbons. The temperature of the reactor was 96° C., a discharge frequency of 800 c.p.s. being maintained. The voltage of the discharge was 9.5 kv. at a current of 70 ma., and a gas flow of 100 cc./min. The mol ratio of hydrocarbon to silicon tetrachloride was about 5 to 1. The liquid yield was 15 gm./hr.

The same mixture of hydrocarbons was reacted also with silicon tetrafluoride at a discharge frequency of 1600 c.p.s. at 14.2 kv. and 100 ma., using a gas flow of 300 cc./min. The mol ratio of hydrocarbons to silicon tetrafluoride was about 6 to 1. The liquid yield was 8 gm./hr.

EXAMPLE 8

*Mixtures of silanes and hydrocarbons*

Since one of the most important silanes, commercially, is the dimethyldichloro-compound, examples of preferred methods of preparing silane mixtures rich in this substance are of particular interest. One such example is the reaction of a mixture of methane and methyltrichlorosilane with silicon tetrachloride. This reaction was carried out at a reactor temperature of 50° C. at a frequency of 3200 c.p.s. The voltage of the discharge was 16.3 kv. at a current of 210 ma., and a gas flow of 120 cc./min. The mol ratio of methane plus methyltrichlorosilane (equal parts) to silicon tetrachloride was about 4 to 1. The yield of liquid was 20 gm./hr.

EXAMPLE 8A

Where production of silanes other than the dimethyldichlorosilane is of interest, a mixture of dimethyldichlorosilane and methane can be reacted with silicon tetrachloride. In one run of this nature, the operating temperature of the reactor was 55° C. at a maintained frequency of 800 c.p.s. The voltage of the discharge was 9 kv. at a current of 80 ma. The mol ratio of methane plus dimethyldichlorosilane (equal parts) to silicon tetrachloride was about 5 to 1. The liquid yield was 10 gm./hr.

In another run, a mixture of trimethylchlorosilane and methane was reacted with silicon tetrachloride at a reactor temperature of 60° C. at a frequency of 800 c.p.s. The voltage of the discharge was maintained at 14.4 kv. at a current of 120 ma., and a gas flow of 200 cc./min. The mol ratio was about 5 mols trimethylchlorosilane plus methane (equal parts) to 1 mol silicon tetrachloride. The liquid yield was 10 g.m./hr.

EXAMPLE 8B

Another run was made in which a mixture of dimethyldichlorosilane, dichloromethane, and methane was reacted with silicon tetrachloride. The operating temperature was 50° C. at a frequency of 800 c.p.s. The voltage of the discharge was 12 kv. at a current of 70 ma., and a gas flow of 100 cc./min. The mol ratio was about 6 mols of equal parts of each of the carbon-containing compounds to 1 mol silicon tetrachloride. The liquid yield was 24 gm./hr.

EXAMPLE 8C

In another run, methane and trichlorosilane were reacted using a mol ratio of methane to silane of about 4 to 1. The temperature of the reactor was 28.7° C. at a frequency of 800 c.p.s. The voltage of the discharge was 14.2 kv. at a current of 42 ma., and the total gas flow was adjusted to 42.3 gm./hr. The product obtained in gm./hr. comprised 5.5 of high-boiling liquids, 28.5 of low-boiling liquids. The low-boiling fraction was composed of 0.7 mol percent methyl chloride, 7.7 mol percent dimethyldichlorosilane and 88.3 mol percent methyltrichlorosilane. The liquid also contained 3.3 mol percent silicon tetrachloride.

What is claimed is:

1. Method of making silanes comprising passing a low temperature electrical discharge of an operating temperature below 200° C. through a vapor phase mixture of a silicon halide and a hydrocarbon in which the mol ratio of said hydrocarbon to said halide is at least 2 to 1.

2. Method of making silanes comprising passing an electrodeless discharge of alternating current through a vapor phase mixture of a silicon halide and a hydrocarbon in which the mol ratio of said hydrocarbon to said halide is at least about 2 to 1, the temperature of the reaction mixture being maintained below 200° C. at a value such that the formation of solid polymers is inhibited.

3. Method of making silanes comprising passing an electrodeless discharge of alternating current at a frequency of at least 25 c.p.s. through a vapor phase mixture of a silicon halide and a hydrocarbon in which the mol ratio of said hydrocarbon to said halide is between about 2 to 1 and 20 to 1, the temperature of the reaction mixture being maintained below 200° C. at a value such that the formation of solid polymers is inhibited.

4. Method of making silanes comprising passing a low temperature electrical discharge of alternating current of an operating temperature below 200° C. and having a frequency of at least 25 c.p.s. through a vapor phase mixture of a silicon halide and a hydrocarbon selected from the class consisting of paraffins, olefins, cycloparaffins, aromatics, terpenes and naphthenes, in which the mol ratio of said hydrocarbon to said halide is between about 2 to 1 and 20 to 1.

5. Method of making silanes comprising passing a low temperature electrical discharge of alternating current of an operating temperature below 200° C. and having a frequency of at least 25 c.p.s. through a vapor phase mixture comprising a substance selected from the class consisting of silicon tetrachloride and alkyl-substituted silicon chlorides, and a hydrocarbon selected from the class consisting of paraffins, olefins, aromatic hydrocarbons, cycloparaffins, terpenes and naphthenes, in which the mol ratio of said hydrocarbon to said silicon compound is at least about 2 to 1.

6. Method of making silanes comprising passing a low temperature electrical discharge of alternating current of an operating temperature below 200° C. and having a frequency of at least 25 c.p.s. through a vapor phase mixture of a silicon halide and methane in which said methane is present in mol excess.

7. Method of making silanes comprising passing a low temperature electrical discharge of alternating current of an operating temperature below 200° C. and having a frequency between about 25 and 10,000 c.p.s. through a vapor phase mixture of a silicon halide and a paraffin hydrocarbon in which the mol ratio of said hydrocarbon to said halide is at least about 2 to 1.

8. Method of making silanes comprising passing a low temperature electrical discharge of alternating current of an operating temperature below 200° C. and having a frequency between about 25 and 10,000 c.p.s. through a vapor phase mixture of a silicon halide and an olefin hydrocarbon in which the mol ratio of said hydrocarbon to said halide is at least about 2 to 1.

9. A method of making silanes comprising passing a low temperature electrical discharge of alternating current of an operating temperature below 200° C. and having a frequency between about 25 and 10,000 c.p.s. through a vapor phase mixture of a silicon halide and a terpene.

10. Method of making silanes comprising passing a low temperature electrical discharge of alternating current of an operating temperature below 200° C. and having a frequency between about 25 and 10,000 c.p.s. through a vapor phase mixture of a silicon halide and a naphthene.

11. Method of making silanes comprising saturating a carrier gas with the vapor of a hydrocarbon which is liquid at ordinary room temperature, mixing silicon halide vapor therewith such that said hydrocarbon is present in mol excess with respect to said halide, subjecting the mixture to an electrodeless discharge of alternating current having a frequency between about 25 and 10,000 c.p.s., an average voltage between about 2 and 12 Kv./mm. in the discharge and a current density between about 0.01 ma. and 5.0 ma. per sq. in.

12. Method of making silanes comprising passing an electrodeless discharge of alternating current through a vapor phase mixture comprising methane and methyltrichlorosilane in which the mol ratio of said methane to said silane is at least about 2 to 1, the temperature of the reaction mixture being maintained below 200° C., at a value such that the formation of solid polymers is inhibited.

13. Method of making silanes comprising passing an electrodeless discharge of alternating current at a frequency of at least 25 c.p.s. through a vapor phase mixture comprising a silane and a hydrocarbon in which the mol ratio of said hydrocarbon to said silane is at least about 2 to 1, to form a product mixture, one component of which is a silane having a lower molecular weight than the silane of said vapor phase mixture, the temperature of the reaction mixture being maintained below 200° C. at a value such that the formation of solid polymers is inhibited.

14. Method of making silanes comprising passing a low temperature electrical discharge of alternating current of an operating temperature below 200° C. and having a frequency between about 25 and 10,000 c.p.s. through a mixture of a silicon halide and a cycloparaffin, said mixture comprising a mol ratio of said paraffin to said halide of at least about 2 to 1.

15. Method of making silanes comprising passing a low temperature electrical discharge of alternating current of an operating temperature below 200° C. and having a frequency between about 25 and 10,000 c.p.s. through a mixture of a silicon halide and an aromatic hydrocarbon, said mixture comprising a mol ratio of said hydrocarbon to said halide of at least about 2 to 1.

References Cited in the file of this patent
UNITED STATES PATENTS

| 2,405,019 | Dalin | July 30, 1946 |
| 2,796,397 | Clasen | June 18, 1957 |